United States Patent
Dhanda et al.

(10) Patent No.: US 9,324,368 B2
(45) Date of Patent: Apr. 26, 2016

(54) METHOD AND STRUCTURE FOR IMPROVING PERFORMANCE AND STORAGE DENSITY IN A DATA STORAGE DEVICE

(71) Applicant: HGST Netherlands B.V., Amsterdam (NL)

(72) Inventors: Abhishek Dhanda, San Jose, CA (US); Toshiki Hirano, San Jose, CA (US); Tetsuo Semba, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/589,573

(22) Filed: Jan. 5, 2015

(65) Prior Publication Data

US 2015/0138666 A1 May 21, 2015

Related U.S. Application Data

(62) Division of application No. 13/593,991, filed on Aug. 24, 2012, now Pat. No. 8,953,266.

(51) Int. Cl.
*G11B 5/56* (2006.01)
*G11B 20/12* (2006.01)
*G11B 5/55* (2006.01)
*G11B 5/09* (2006.01)
*G11B 5/596* (2006.01)

(52) U.S. Cl.
CPC .............. *G11B 20/1252* (2013.01); *G11B 5/09* (2013.01); *G11B 5/5543* (2013.01); *G11B 5/56* (2013.01); *G11B 5/59694* (2013.01); *G11B 2020/1238* (2013.01)

(58) Field of Classification Search
CPC .. G11B 5/59694; G11B 5/00834; G11B 5/54; G11B 5/55; G11B 5/5586; G11B 20/00572; G11B 5/5543; G11B 5/5965
USPC ......... 360/48, 55, 45, 75, 77.08, 77.01, 97.19
See application file for complete search history.

(56) References Cited

U.S. PATENT DOCUMENTS

| | | | |
|---|---|---|---|
| 5,570,244 A | 10/1996 | Wiselogel | |
| 6,061,197 A | 5/2000 | Wiselogel | |
| 6,097,565 A * | 8/2000 | Sri-Jayantha | G11B 5/59627 360/77.04 |
| 6,111,714 A | 8/2000 | Ueda et al. | |
| 6,130,797 A * | 10/2000 | Akagi | G11B 5/59627 360/77.04 |
| 6,327,112 B1 | 12/2001 | Ide et al. | |
| 6,405,277 B1 | 6/2002 | Jen et al. | |
| 6,952,320 B1 * | 10/2005 | Pollock | G11B 5/59627 360/63 |
| 7,002,769 B2 * | 2/2006 | Kagami | G11B 5/5547 360/75 |
| 7,161,759 B1 | 1/2007 | Zhang et al. | |
| 7,298,568 B2 | 11/2007 | Ehrlich et al. | |
| 7,394,607 B2 | 7/2008 | Ohno et al. | |

(Continued)

*Primary Examiner* — Thomas Alunkal

(57) ABSTRACT

A data storage device with improved data storage densities, coupled with lower hard error and write-inhibit events is described. A feed-forward write inhibit (FFWI) method enables data tracks to be written more densely. Alternatively, the FFWI method may reduce the hard error and write inhibit events to improve data storage performance. A concept of virtual tracks enables the FFWI method to be applied to the writing of circular data tracks with non-circular servo tracks, or to the writing of non-circular data tracks with PES data from circular servo tracks—in both cases, improvements to performance and/or storage densities are enabled. The FFWI method may also be applied to the case of both non-circular servo and data tracks.

18 Claims, 12 Drawing Sheets

(56) References Cited

U.S. PATENT DOCUMENTS

| | | |
|---|---|---|
| 7,417,821 B2 | 8/2008 | Tsuchinaga |
| 7,848,048 B1 | 12/2010 | Albrecht et al. |
| 8,094,403 B2 | 1/2012 | Wood et al. |
| 8,134,802 B2 | 3/2012 | Bai et al. |
| 8,724,248 B2 | 5/2014 | Dhanda et al. |
| 2003/0016473 A1 | 1/2003 | Kim |
| 2004/0004783 A1* | 1/2004 | Takaishi ............ G11B 5/59644 360/75 |
| 2004/0021975 A1* | 2/2004 | Meyer ................ G11B 5/012 360/75 |
| 2005/0141126 A1 | 6/2005 | Ehrlich et al. |
| 2005/0185319 A1* | 8/2005 | Liu ..................... G11B 19/045 360/77.04 |
| 2005/0237649 A1 | 10/2005 | Ehrlich |
| 2007/0097539 A1* | 5/2007 | Sado .................. G11B 5/59638 360/77.05 |
| 2007/0242386 A1 | 10/2007 | Finamore et al. |
| 2008/0002277 A1* | 1/2008 | Sacks .................. G11B 5/5534 360/75 |
| 2011/0188149 A1 | 8/2011 | Albrecht et al. |
| 2013/0135764 A1 | 5/2013 | Dhanda et al. |
| 2013/0342931 A1 | 12/2013 | Grobis |

* cited by examiner

METHOD AND STRUCTURE FOR IMPROVING PERFORMANCE AND STORAGE DENSITY IN A DATA STORAGE DEVICE

This application is a Divisional of U.S. Utility patent application Ser. No. 13/593,991, filed Aug. 24, 2012, which is incorporated herein by reference in its entirety.

TECHNICAL FIELD OF THE INVENTION

The present invention relates to data storage devices, and in particular to data storage devices with various data storage regions having different optimization requirements, such as write inhibit rates, hard error rates, and data storage densities.

BACKGROUND OF THE INVENTION

The present invention relates to data storage devices employing rotating data storage media. As described in U.S. Pat. No. 7,394,607, the location of the write head relative to the desired location of the track is the position error signal (PES), which is generated during passage of the read head over a "servo burst region" contained within a servo zone (also termed a "servo spoke"). Typical disks may have more than 250 approximately radial servo zones, thereby providing PES values roughly every 1° of rotation of the disk medium. U.S. Pat. Publication No. 2011/0188149A1 is an example of the use of servo bursts for generation of PES values.

U.S. Pat. No. 6,111,714 illustrates the use of adaptive control of the write inhibit signal as a function of the measured velocity of the write head, as may occur during data storage device operation in a operational vibration or shock environment, as may be the case for a computer playing loud audios or movies. The benefits of reducing the number of write inhibit events in such an environment are demonstrated in U.S. Pat. No. 7,633,698B2, which discusses the use of an accelerometer to detect the acceleration of the data storage device, enabling a differentiation between vibratory and one-time shock events. In particular, when the disk drive is not subject to vibration, the write inhibit threshold may be lowered to enable more sensitive detection of one-time shock events. Under vibratory conditions, the write inhibit threshold may be increased to a more normal level, thereby avoiding an excessive number of WI events. Operational shock may result in large PES values over short time periods during which it may be preferred to prevent write or read events, thereby avoiding writing outside the desired track regions, and possibly even "head crashes".

FIG. 1 is a schematic diagram 100 of two neighboring tracks 102 and 104 in a disk storage device with write inhibit based on a fixed PES range. The track center 106 for track 102 is shown as a curved line, representing a sequence of position error signals (PES) generated each time the read head passes over a servo burst region while writing track 102. The track center 108 for track 104 differs from the track center 106 for track 102 as shown. Dashed line 110 represents the maximum positive PES value for writing track 102—any PES values larger than this (representing cases where track center 106 extends to the right of line 110), will induce a write inhibit event for track 102. The distance 112 between track center 102 and PES limit 110 is set equal to L (see FIG. 2). Similarly, the PES limits when writing track 104 are shown as dashed lines 114 and 118. Anytime track center 108 extends to the left of line 114, or to the right of line 118, a write inhibit event will be triggered. Spacings 116 and 120 are both equal to "L". The inter-track spacing 122 is described in FIG. 2.

FIG. 2 is a schematic graph 200 of the probabilities of various PES values 250 and 252 for two neighboring tracks in a data storage device employing shingled method recording (SMR) without feed-forward (FF) as illustrated in FIG. 1. The desired center 202 of track 1 corresponds to track 102 in FIG. 1, while the desired center 204 of track 2 corresponds to track 104. The vertical axis in FIG. 2 corresponds to the probability of the PES having the values shown along the horizontal axis 270. Experimental measurements confirm that we can assume that the PES values are roughly normally-distributed, falling on the two standard deviation curves shown centered on the track centers 202 and 204. From the specifications of the recording system, a minimum allowable track center-to-center spacing, W, is determined. To ensure data integrity, a write inhibit (WI) condition is imposed whenever the PES value exceeds limits of ±L, thus the write-inhibit criteria are (on a sector-by-sector basis):

$PES(k) \geq L$, and $PES(k) \leq -L$, where k=the track number (either 1 or 2 in this example). Each of these events (which are obviously mutually-exclusive) occurs with a probability of $Q(L/\sigma)$, where the Q-function is the tail probability:

$Q(x) = 0.5 - 0.5 erf(x/\sqrt{2})$, and erf is the error function. Thus the total probability of one or the other event occurring is clearly $2 Q(L/\sigma)$.

For proper data storage device performance, we require that $2 Q(L/\sigma) \sim 10^{-3}$, which determines the value for L in units of T. Since in practice $L \cong 0.13\,T$, we can determine a value for $\sigma$ (also in units of T) by solving for $\sigma$ in this equation:

$2Q(L/\sigma) = 10^{-3}$ which gives a value for the standard deviation $\sigma \cong 0.04\,T$ (the factor of "2" arises due to the possibility for both positive and negative head excursions). Thus a PES value of 0.13 T represents a deviation of the head from the desired track position of roughly 0.13/0.04=3.25 standard deviations. As shown in FIG. 2, an additional margin, E, is added to account for PES noise so that the probability of a head excursion of L+E is approximately $10^{-6}$:

$2Q((L+E)/\sigma) \sim 10^{-6}$.

In practice, values of E of roughly 0.05 T are used. Typical values of T may be around 17 nm with track widths of 7 nm. Thus we now can determine a value for "W" in units of T, since T=W+2L+2E:

$W = T - 2L - 2E = T - 2(0.13T) - 2(0.05T) = 0.64T$.

Clearly this method for determining T may be somewhat conservative, since in all cases a worst-case potential value for the PES values of neighboring tracks is used to determine T and W. As FIG. 1 illustrates, if track center 106 happens to be to the left of track 102, then the spacing between track center 108 and track 106 will exceed the minimum allowable spacing W, resulting in needlessly large spacings between the written tracks. If track center 106 is at location 260 in FIG. 2 at the same time as track center 108 is at location 262 in FIG. 2, then the tracks will be at their minimum allowable spacing of W—in essentially all other situations, the actual spacing between track centers 106 and 108 will be larger than W, indicating sub-optimal (too low) storage densities (tracks per inch or TPI).

Thus it would be desirable to account for the actual track center of a neighboring track when writing the next track, especially when employing shingled writing, in order to reduce the amount of time that the inter-track spacing exceeds the minimum allowable value of W.

There are three parameters which may be used to characterize the performance of data storage devices:
1) The number of write inhibit (WI) hits—we would like to minimize this, all other parameters being constant,
2) The number of hard errors (HE)—we would also like to minimize this, again all other parameters being constant, and
3) The data storage density (tracks per inch, TPI)—we would like to maximize this, all other parameters being constant.

For different regions of the disk medium, different overall optimization strategies may be desirable:
1) In E-regions (temporary cache regions), improving performance may be preferred, possibly at the expense of data storage density. This is because in these regions, the data will eventually be moved to an I-region, but for the moment, this data is being stored at the maximum rate possible, thus minimizing the number of WI and HE events is preferred over maximizing the TPI.
2) In I-regions (final "home" or destination regions), improving the areal data storage density (TPI) may be preferred. For these regions, more dense storage is preferred since I-regions are written whenever possible (rewriting data from E-regions) or when large sequential writing is in progress.

Thus it would be advantageous to provide a method for feed forward write inhibit (FFWI) control which optimizes the writing strategy for both I- and E-regions, possibly with differing optimization strategies. It would also be advantageous to provide a method for write inhibit control which improves the performance of a disk drive in an operational vibration environment.

SUMMARY OF THE INVENTION

Aspects of the present invention provide a method for improved data storage in a hard disk drive or other data storage device employing a rotating medium. In some embodiments, an improved write inhibit method employs a feed-forward method which takes into account the actual location of a neighboring data track to reduce the average track-to-track spacing. Advantages of the method are improved data storage density (tracks per inch, TPI), and reduced hard error and write inhibit hits to the writing performance.

In some embodiments, virtual tracks enable improved storage densities, while lowering hard error and write inhibit events. Both conditions of circular servo tracks with non-circular data tracks, as well as non-circular servo tracks and circular data tracks, may be addressed through the virtual track concept.

In further embodiments, improved performance in an operational vibration environment is enabled through the feed forward write inhibit method, with trade-offs between performance and storage density.

DETAILED DESCRIPTION OF ALTERNATIVE EMBODIMENTS

Embodiments of the invention can provide one or more advantages over write inhibit methods employing fixed PES limits. Not all embodiments may provide all the benefits.

Feed Forward Write Inhibit (FFWI) Strategy According to the Invention

Figure 3:
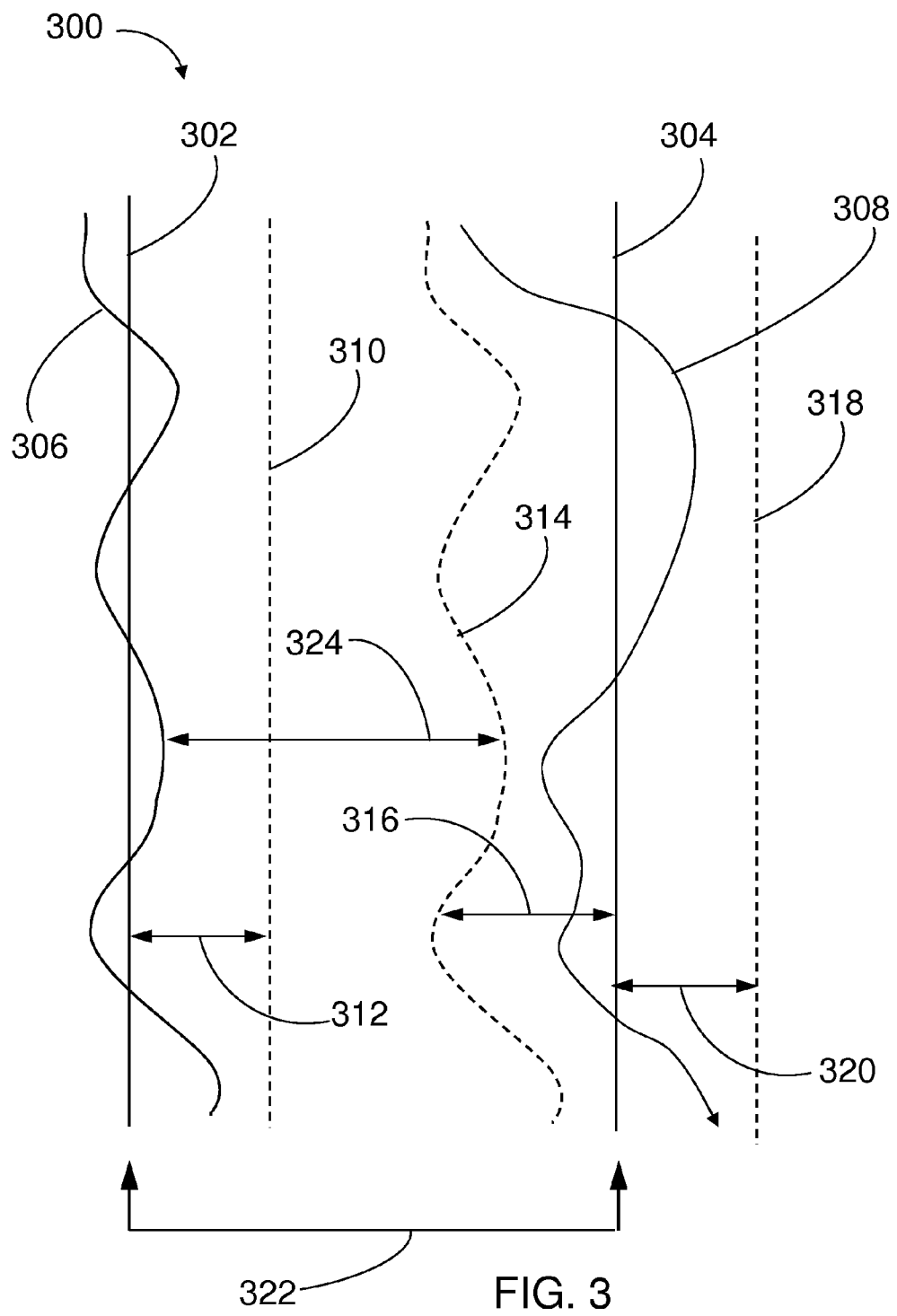
FIG. 3 is a schematic diagram of a disk storage device with feed forward write inhibit according to the present invention.

FIG. 3 is a schematic diagram 300 of two neighboring tracks 302 and 304 in a disk storage device with feed forward write inhibit (FFWI) according to the present invention. The track center 306 for track 302 is shown as a curved line, representing a sequence of position error signals (PES) generated each time the read head passes over a servo burst region while writing track 302. The track center 308 for track 304 differs from the track center 306 for track 302 as shown. Dashed line 310 represents the maximum positive PES value for writing track 302—any PES values larger than this (representing cases where track center 306 extends to the right of line 310), will induce a write inhibit event for track 302. The distance 312 between track center 302 and PES limit 310 is generally set equal to L.

A key difference in the present invention is the method for setting the left-side (negative PES) write-inhibit threshold, dashed line 314. As can be seen in FIG. 3, line 314 has the same shape as track center 306 but offset to the right a distance 324, at a spatial resolution along the tracks corresponding to the spacing of PES measurements along tracks 302 and 304. Since typical disk media may have an internal diameter (ID) of 13 mm and an outer diameter (OD) of 30 mm, with at least 250 servo spokes, the spatial distance between PES values along the tracks is:

(at ID): $(\pi 13 \text{ mm})/250 \approx 160 \text{ }\mu\text{m}$, (at OD): $(\pi 30 \text{ mm})/250 \approx 380 \text{ }\mu\text{m}$.

Figure 1:
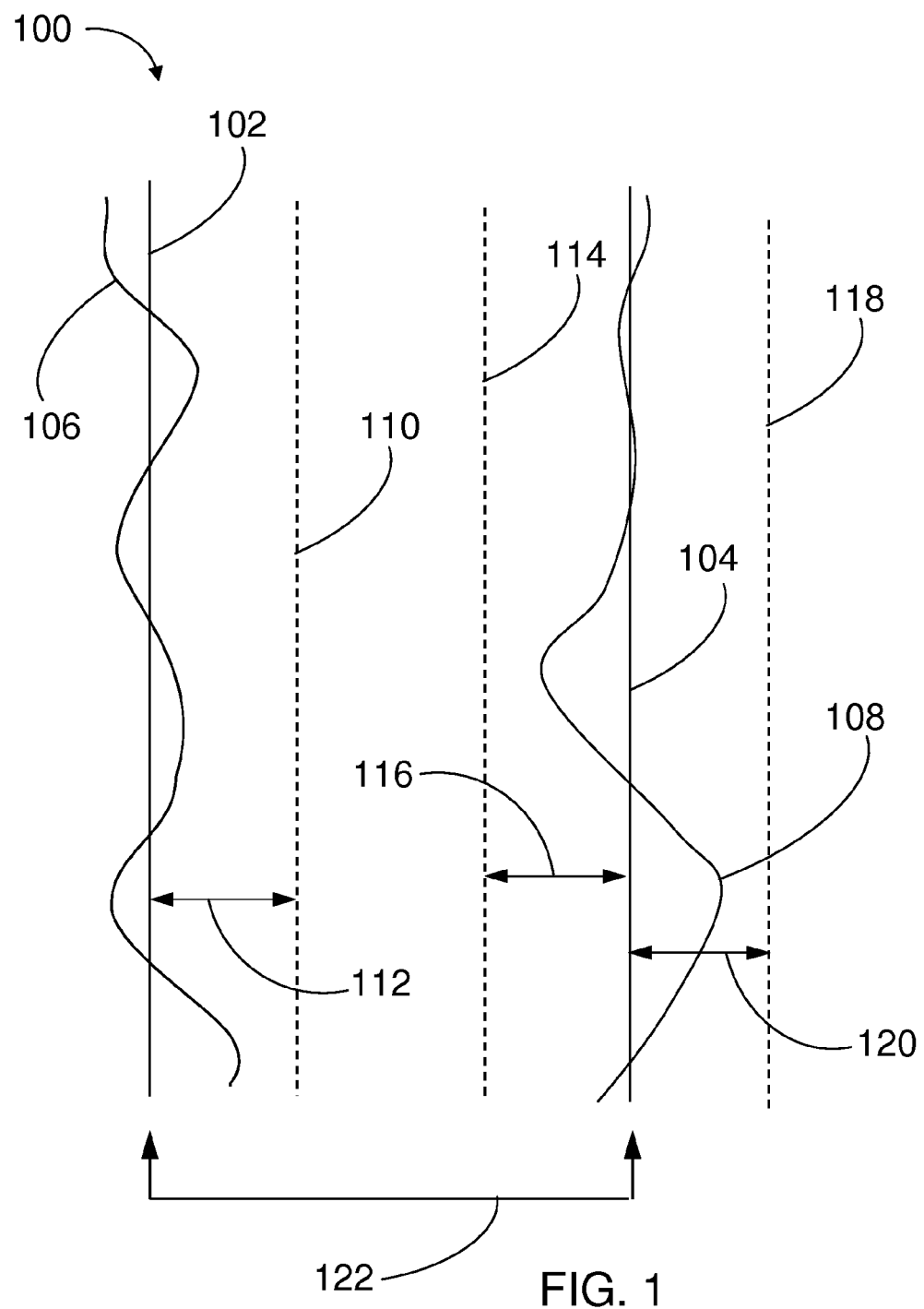
FIG. 1 is a schematic diagram of a disk storage device with write inhibit based on a fixed PES range.

The distance 324 corresponds to the spacing between track center 306 and the negative PES limit 314 for track 304. Thus a WI event will only be triggered if track center 308 strays to the left of line 314. A benefit of the present invention is immediately apparent—the left-side WI limit 314 for track 304 now takes into account the actual track center 306 for the neighboring track 302 instead of merely employing the worst-case track center limit (i.e., negative limit 114 in FIG. 1). Clearly this may allow closer spacing of tracks. Alternatively, other performance criteria such as the number of write-inhibit (WI) events or the hard error (HE) rate may be improved. Various combinations of increased tracks per inch and lower WI and/or HE events are also possible, as will be illustrated in FIGS. 5 and 6, below.

Figure 2:
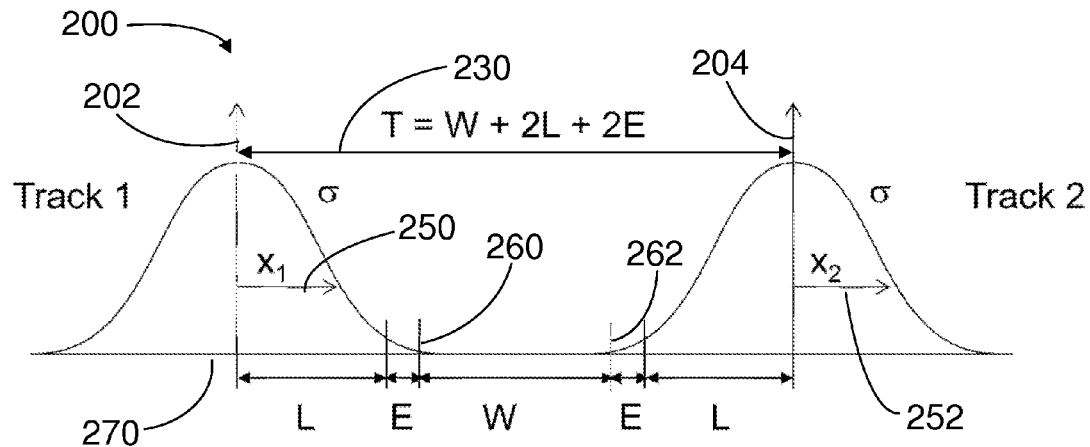
FIG. 2 is a schematic graph of the probabilities of various PES values for two neighboring tracks as illustrated in FIG. 1.
Figure 4:
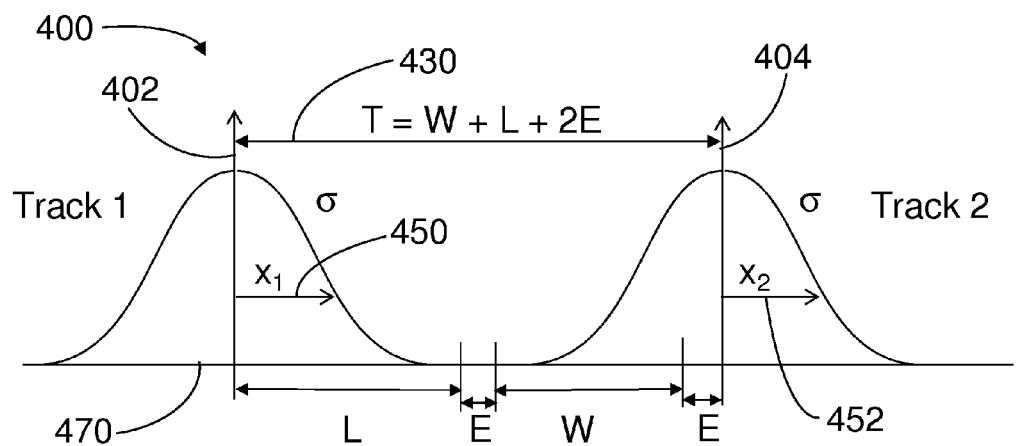
FIG. 4 is a schematic graph of the probabilities of various PES values for two neighboring tracks according to the invention as illustrated in FIG. 3.

FIG. 4 is a schematic graph 400 of the probabilities of various PES values 450 and 452 for two neighboring tracks in a data storage device configured according to the invention as illustrated in FIG. 3. The desired center 402 of track 1 corresponds to track 302 in FIG. 3, while the desired center 404 of track 2 corresponds to track 304. The vertical axis in FIG. 4 corresponds to the probability of the PES having the values shown along the horizontal axis. The same assumptions about the normal distribution of PES values apply as in FIG. 2. The same minimum allowable track center-to-center spacing W is also applicable here, since it is determined from characteristics of the write head (e.g., writing width). The write inhibit criteria are (on a sector-by-sector basis):

$PES(k) \geq L$=spacing 320 between track 304 and line 318, and $PES(k) \leq -\alpha L + PES(k-1)$=spacing 316 between line 314 and track 304.

where k=the track number (either 1 or 2 in this example). Note that for the worst-case PES scenario for track k−1 (i.e., where PES(k−1)=L), then if α=2, we have the conventional case (on a sector-by-sector basis):

$PES(k) \geq L$, and $PES(k) \leq -\alpha L + PES(k-1) = -2L + L = L$ (with α=2 and for the worst-case of PES(k−1)=L).

The parameter α is called the "FFWI Factor" and has a range of: $1 \leq \alpha \leq 2.2$ in FIGS. 5-8. The optimum value for α is determined by the type of region being written (E- or I-) and the desired trade-offs between WI rate, HE rate, and TPI. FIGS. 5-8 discuss the range of choices for α and how it affects these three operating parameters.

One implementation cost for the FFWI method is the requirement to maintain in memory all the PES samples (typically 16-bit=2-byte each) for the last written track in each I-region. For a 250 sector track, this would require 500 bytes. Another implementation cost is the need to impose sector-by-sector WI criteria which are different on the left- and right-hand sides of the track being written. PES information during an emergency power off (EPO) event may be retained, or, alternatively, a method may be implemented for completing a first write into an I-region without the PES data from the previous track (in this case, PES(k−1)=L could be assumed in the WI limit formula above, where k−1=the previous track for which we do not have actual PES data). One method for accomplishing this would be to leave one physical track guard band for the first I-region write operation just following an EPO event. In a sequential bypass mode, where a new track is written into the middle of the I-region, the same strategy of leaving a physical guard band might work as well.

A potential problem with the FFWI method of the present invention is the possibility of accumulating radial asymmetries as more and more tracks are written radially outwards (or inwards) in shingle mode. This may be ameliorated by occasionally doing a "restart" with a track guard band and then a track written using fixed WI limits (i.e., ±L) as discussed in FIGS. 1 and 2.

Data Storage Device Operation for E-Regions (Temporary Caches)

Figure 5:
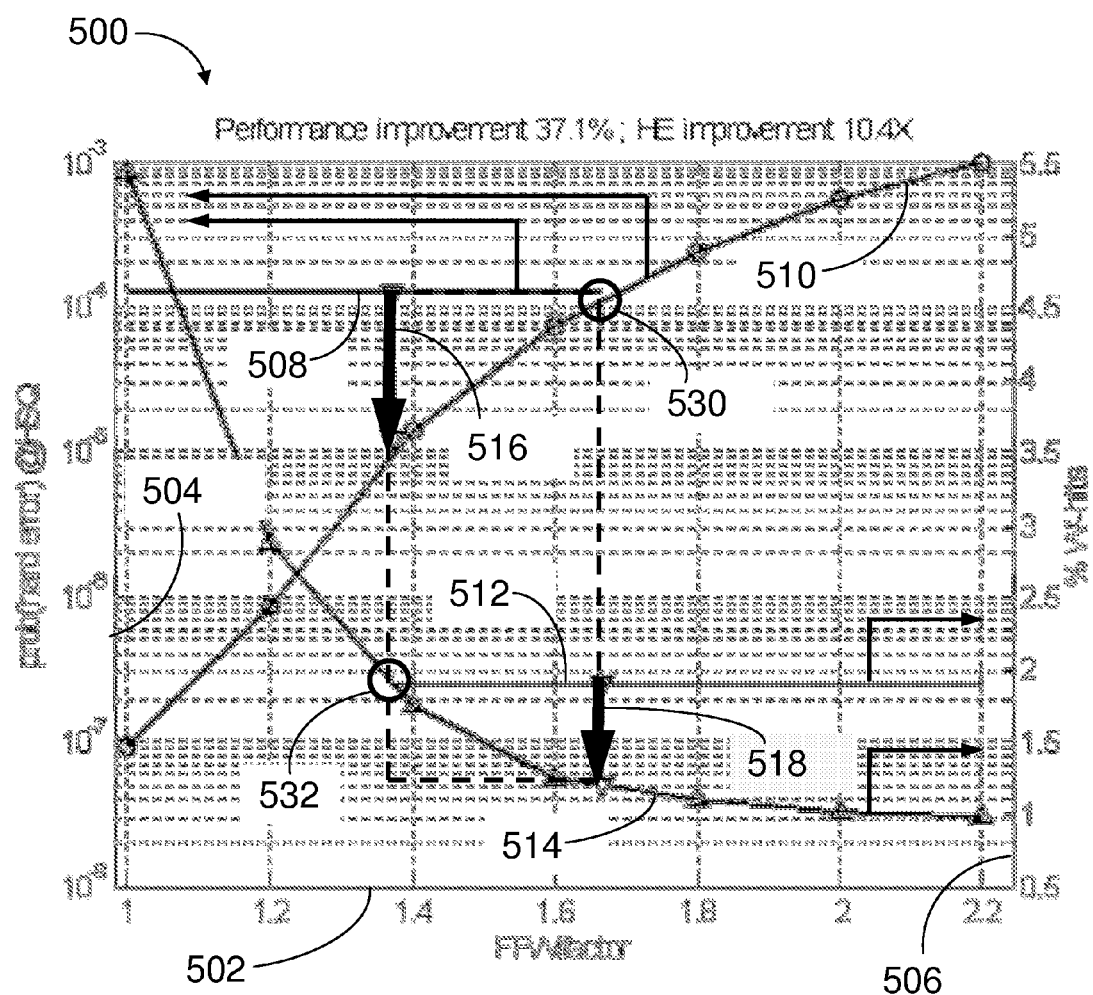
FIG. 5 is a graph characterizing data storage device operation according to the invention for writing in a temporary cache region.

FIG. 5 is a graph 500 characterizing data storage device operation according to the invention for writing in a temporary cache region. System performance is compared between Shingled Mode Recording (SMR) without feed-forward (FF) ["SMR w/o FF"] and SMR with FF ["SMR w FF"], corresponding to the present invention. SMR w/o FF corresponds to PES limits which are independent of the FFWI Factor α, which is plotted along the horizontal axes 502, 602, 702, and 802, in graphs 500 through 800, respectively. Thus, all curves for SMR without FF will be horizontal lines, independent of α. Conversely, all curves for the present invention will be functions of α. As discussed in the Background section, for temporary cache regions ("E-regions"), it is generally more useful to maximize writing speeds or "performance", possibly at the expense of data storage density (TPI). "Performance" may be decreased by two parameters: the hard-error (HE) rate, and the percent of write-inhibit (WI) hits. Curve 508 corresponds to the probability of a hard error for SMR without FF, while curve 510 corresponds to the probability of a hard error for the present invention—curves 508 and 510 relate to axis 504. Curve 512 corresponds to the percentage of WI-hits for SMR without FF, while curve 514 corresponds to the percentage of WI hits for the present invention—curves 512 and 514 relate to axis 506.

For both axes 504 and 506, improved performance corresponds to lower values. Circle 530 is the intersection between curves 508 and 510—values on curve 510 to the left of circle 530 correspond to values of the FFWI Factor for which the present invention (SMR w FF) enables lower hard error rates than for SMR without FF. Values on curve 510 to the right of circle 530 correspond to situations where SMR without FF has lower HE rates making these FFWI factors undesirable. Circle 532 is the intersection between curves 512 and 514—values on curve 514 to the right of circle 532 correspond to values of the FFWI Factor for which the present invention (SMR w FF) enables fewer WI-hits than for SMR without FF. Values on curve 514 to the left of circle 532 correspond to values of the FFWI Factor for which SMR without FF has lower WI-hits making these FFWI Factors also undesirable. The range of FFWI Factors between circles 532 and 530 correspond to a range over which the present invention is advantageous over SMR without FF with respect to both HE rates and WI-hits. Arrow 516 (at α≈1.37) represents a 10.4 times lower HE rate for the present invention with the same level of WI hits and squeeze (see FIG. 6)—this may be beneficial under extreme operational vibration conditions (see FIGS. 7 and 8). Arrow 518 (at α≈1.66) represents a 37.1% reduction in WI hits for the present invention—this is more suited to an E-region since it enables higher writing speeds without increasing the HE rate or write-to-write track misregistration (WWTMR). Thus values of the FFWI Factor over the range $1.37 \leq \alpha \leq 1.66$ provide a range of choices providing both decreased HE rates and decreased WI hits relative to the SMR without FF.

Data Storage Device Operation for I-Regions (Final "Home" or Destination Regions)

Figure 6:
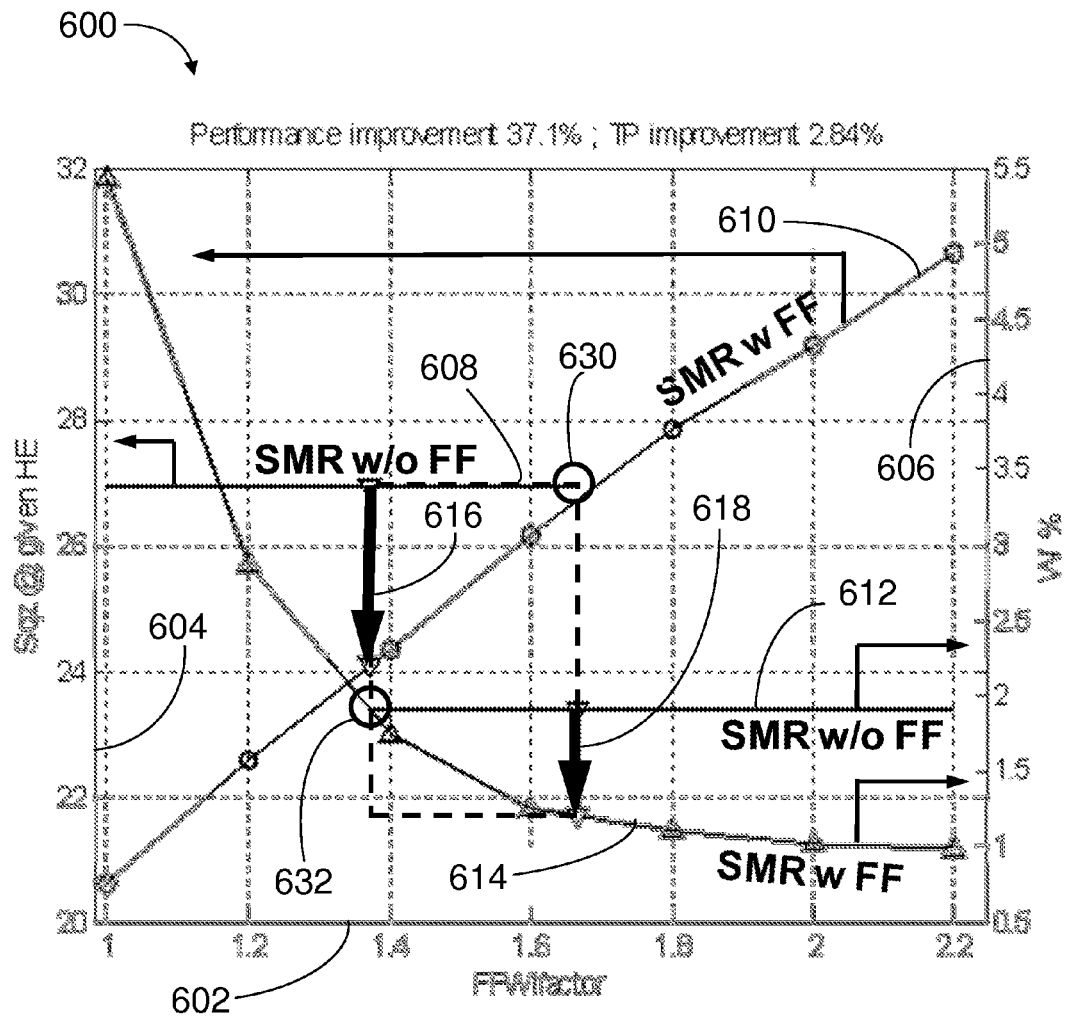
FIG. 6 is a graph characterizing data storage device operation according to the invention for writing in a "home" or destination region.

FIG. 6 is a graph 600 characterizing data storage device operation according to the invention for writing in a final "home" or destination region. As in FIG. 5, system performance is compared between Shingled Mode Recording (SMR) without feed-forward (FF) and SMR with FF, corresponding to the present invention. Curves 608 and 612 for SMR without FF are horizontal lines, independent of α. Curves 610 and 614 for the present invention are functions of α (horizontal axis 602). As discussed in the Background section, for final "home" or destination regions ("I-regions"), it is generally more useful to maximize data storage density (TPI), possibly at the expense of writing speeds (which may be limited by WI hit rates and/or HE rates). Curve 608 corresponds to the "squeeze" at a given HE rate for SMR without FF, while curve 610 corresponds to the probability of a hard error for the present invention—curves 608 and 610 relate to axis 604. Curve 612 corresponds to the percentage of WI-hits for SMR without FF, while curve 614 corresponds to the percentage of WI hits for the present invention—curves 612 and 614 relate to axis 606 and represent the same data as curves 512 and 514, respectively, in FIG. 5.

For both axes 604 and 606, improved performance corresponds to lower values. Circle 630 is the intersection between curves 608 and 610—values on curve 610 to the left of circle 630 correspond to values of the FFWI Factor α for which the present invention enables lower squeeze values (more tracks per inch) than for SMR without FF. Values on curve 610 to the right of circle 630 correspond to situations where SMR without FF has lower squeeze making these FFWI factors undesirable. Circle 632 is the intersection between curves 612 and 614—values on curve 614 to the right of circle 632 correspond to values of the FFWI Factor α for which the present invention enables lower WI-hits than for SMR without FF. Values on curve 614 to the left of circle 632 correspond to values of the FFWI Factor for which SMR without FF has fewer WI-hits making these FFWI Factors undesirable. The range of FFWI Factors α between circles 632 and 630 corresponds to a range over which the present invention is advantageous over SMR without FF with respect to both squeeze and WI-hits. Arrow 616 (at α≅1.37) represents a 2.84% higher TPI for the present invention—this increases the areal density without degrading data reliability. Arrow 618 (at α≈1.66) represents a 37.1% improvement in WI hits for the present invention with the same squeeze and HE rate. Thus values of the FFWI Factor over the range 1.37≤α≤1.66 provide a mixture of higher TPI and decreased WI hits (without increasing the HE rate or WWTMR) relative to SMR without FF.

Selection of FFWI Factor for Two Embodiments of the Present Invention

In a first embodiment of the present invention, the FFWI Factor α may have a different value for different physical zones on the storage medium. As discussed above, for E-regions, the trade-off is between performance and HE rates. This is applicable to any cache or temporary storage region where data is first written, typically as fast as possible to avoid delaying the host device. Tuning of the optimal α value may easily be performed on-line. For I-regions, the trade-off is between performance and higher TPI (denser storage). This is applicable to any region where data is finally stored and efficiency of storage is more useful (maximize TPI). Although on-line adjustment is possible, off-line tuning may be most practical.

In a second embodiment of the present invention, in an operational vibration ("op-vib") environment, a trade-off between performance and HE rates (similar to that used in writing E-regions) is applicable. As PES prediction rates are affected by op-vib, the FFWI Factor α may be adjusted to lower HE rates, or at least maintain HE rates in the face of increased vibration-induced head motions.

Data Storage Device Operation for E-Regions in Operational Vibration Conditions

Figure 7:
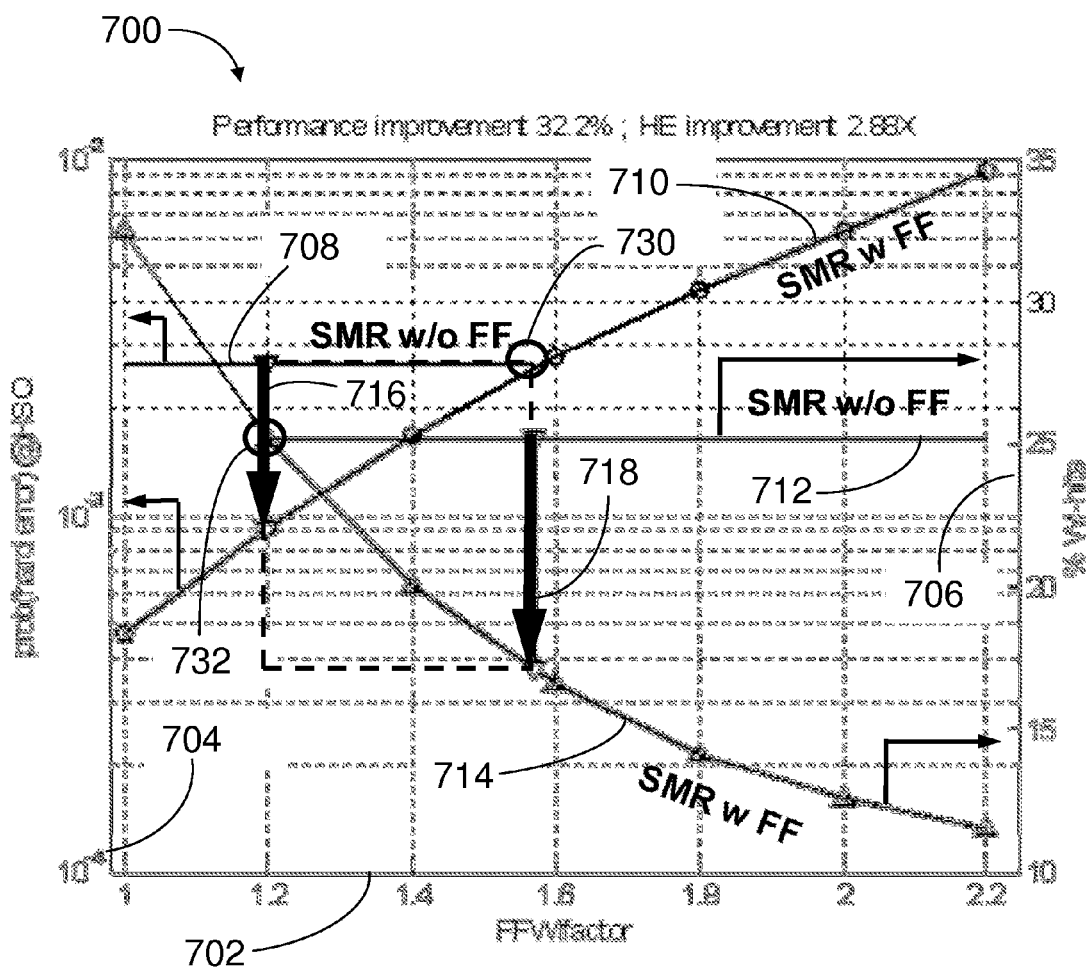
FIG. 7 is a graph characterizing data storage device operation according to the invention for writing in a temporary cache region under 100% volume pink noise conditions.

FIG. 7 is a graph 700 similar to graph 500 in FIG. 5, except under large speaker vibration environment in a laptop computer while playing loud music. As a result of this op-vib environment, the ranges for the FFWI Factor α are shifted to lower values, typically over the approximate range 1.2≤α≤1.56 (compared with the range 1.37≤α≤1.66 in the absence of loud noise). This shift to lower α values compensates for the increased head motion induced by the op-vib environment since lower α values cause the FFWI method of the present invention to trigger WI events for smaller negative head excursions (i.e., line 314 is moved to the right in FIG. 3).

In FIG. 7, system performance is compared between Shingled Mode Recording (SMR) without feed-forward (FF) and SMR with FF, corresponding to the present invention. Curve 708 corresponds to the probability of a hard error for SMR without FF, while curve 710 corresponds to the probability of a hard error for the present invention—curves 708 and 710 relate to axis 704. Curve 712 corresponds to the percentage of WI-hits for SMR without FF, while curve 714 corresponds to the percentage of WI hits for the present invention—curves 712 and 714 relate to axis 706.

For both axes 704 and 706, improved performance corresponds to lower values. Circle 730 is the intersection between curves 708 and 710, while circle 532 is the intersection between curves 712 and 714. The same considerations apply here as for FIG. 5. The range of FFWI Factors (axis 702) between circles 732 and 730 corresponds to a range over which the present invention is advantageous over SMR without FF with respect to both HE rates and WI-hits. Arrow 716 (at α≈1.2) represents a 2.88 times lower HE rate with the same WI rate and squeeze—this may be beneficial under extreme operational vibration conditions. Arrow 718 (at α≈1.56) represents a 32.2% improvement in WI hits with the same HE rate and squeeze—this is more suited to an E-region since it enables higher writing speeds without increasing the HE rate or write-to-write track misregistration (WWTMR). Thus values of the FFWI Factor α over the range 1.2≤α≤1.56 provide a mixture of both decreased HE rates and decreased WI hits relative to SMR without FF.

Data Storage Device Operation for I-Regions in Operational Vibration Conditions

Figure 8:
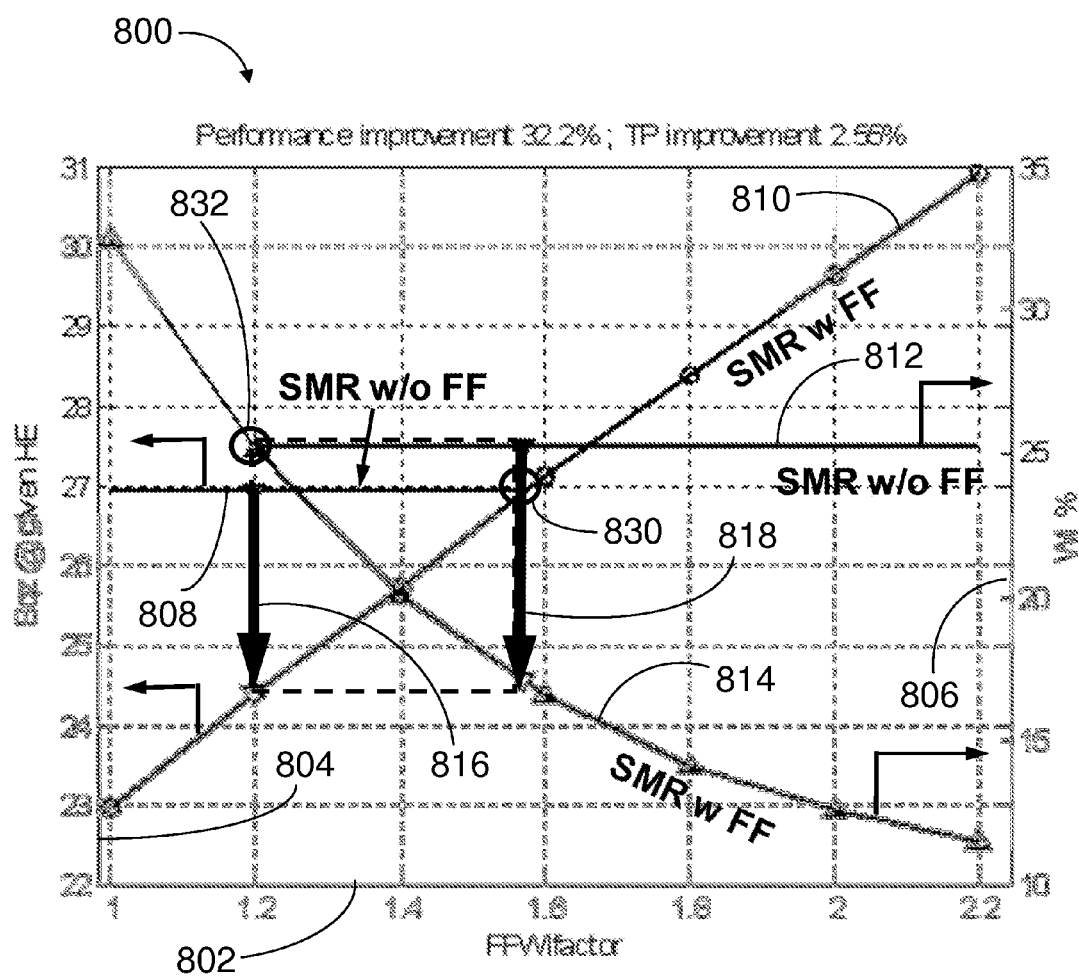
FIG. 8 is a graph characterizing data storage device operation according to the invention for writing in a "home" or destination region under 100% volume pink noise conditions.

FIG. 8 is a graph 800 similar to graph 600 in FIG. 6, except under large speaker vibration environment in a laptop computer while playing loud music. As in FIG. 7, a result of the op-vib environment is a lower range for the FFWI Factor α. Curves 808 and 812 for SMR without FF are horizontal lines, independent of α. Curves 810 and 814 for the present invention are functions of α. Curve 808 corresponds to the "squeeze" at a given HE rate for SMR without FF, while curve 810 corresponds to squeeze for the present invention—curves 808 and 810 relate to axis 804. Curve 812 corresponds to the percentage of WI-hits for SMR without FF, while curve 814 corresponds to the percentage of WI hits for the present invention—curves 812 and 814 relate to axis 806 and represent the same data as curves 712 and 714, respectively, in FIG. 7).

For both axes 804 and 806, improved performance corresponds to lower values. Circle 830 is the intersection between curves 808 and 810, while circle 832 is the intersection between curves 812 and 814. The same considerations apply here as for FIG. 7. The range of FFWI Factors α between circles 832 and 830 corresponds to a range over which the present invention is advantageous over SMR without FF with respect to both squeeze and WI-hits. Arrow 816 (at α≈1.2) represents the 2.55% higher TPI with the same WI and HE rates—this increases the areal density without degrading data reliability. Arrow 818 (at α≈1.56) represents a 32.2% improvement in WI hits with the same squeeze and HE rate. Thus values of the FFWI Factor α over the range 1.2≤α≤1.56 provide a mixture of higher TPI and decreased WI hits (without increasing the HE rate or WWTMR).

Figure 9:
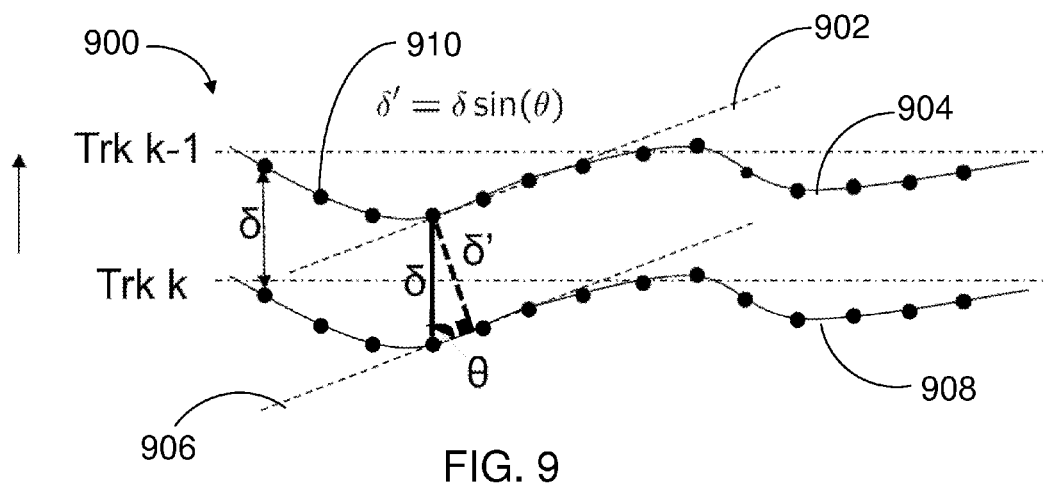
FIG. 9 is a schematic diagram of two neighboring tracks, showing data squeeze.

Radial Distance Measurements: Non-Circular and Virtual Tracks, Effects and Corrections FIG. 9 is a schematic diagram 900 of two neighboring tracks, k−1 and k, in a data storage device employing SMR without FF, showing data squeeze. Track center 904 corresponds to track k−1 and track center 908 corresponds to track k—individual PES values along track centers 904 and 908 are illustrated by black circles 910. The radial spacing δ between track centers 904 and 908 may not be representative of the actual inter-track spacing due to the trigonometric effect shown by the triangle having a hypotenuse δ and angle θ. The tangent 902 to curve 904 and the tangent 906 to curve 908 represent the local angles between the track center curves and the average track position. The actual distance between tangents 902 and 906 is $\delta' = \delta \sin(\theta) \leq \delta$, where θ may differ from 90° by as much as 1° or more.

Figure 10:
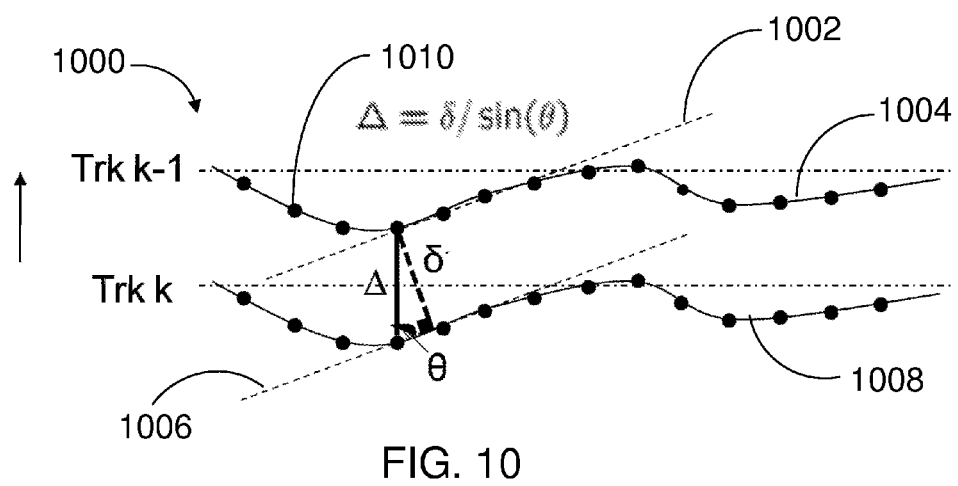
FIG. 10 is a schematic diagram of two neighboring tracks in a data storage device according to the invention, showing a proposed solution to the data squeeze problem illustrated in FIG. 9.

FIG. 10 is a schematic diagram 1000 of two neighboring tracks, k−1 and k, in a data storage device according to the invention, showing a proposed solution to the data squeeze problem illustrated in FIG. 9. Track center 1004 corresponds to track k−1 and track center 1008 corresponds to track k—individual PES values along track centers 1004 and 1008 are illustrated by black circles 1010. The tangent 1002 to curve 1004 and the tangent 1006 to curve 1008 represent the local angles between the track center curves and the average track position. Now, according to the present invention, the actual inter-track spacing is the desired minimum value δ, while the radial spacing is $\Delta = \delta/\sin(\theta) \geq \delta$. Thus tracks 1004 and 1008 are no longer squeezed since the effective track separation has been increased by the factor: $1/\sin(\theta) \geq 1$. Implementation of this method for prevention of squeeze utilizes the servo PES values from multiple sectors on the previous track. A polynomial fit is then made to these PES values to eliminate numerical errors in the determination of the angle θ. The desired spacing $\Delta = \delta/\sin(\theta)$ is then calculated, given the desired minimum spacing δ.

Servo Tracks, Data Tracks, and PES Directional Issues

Figure 11:
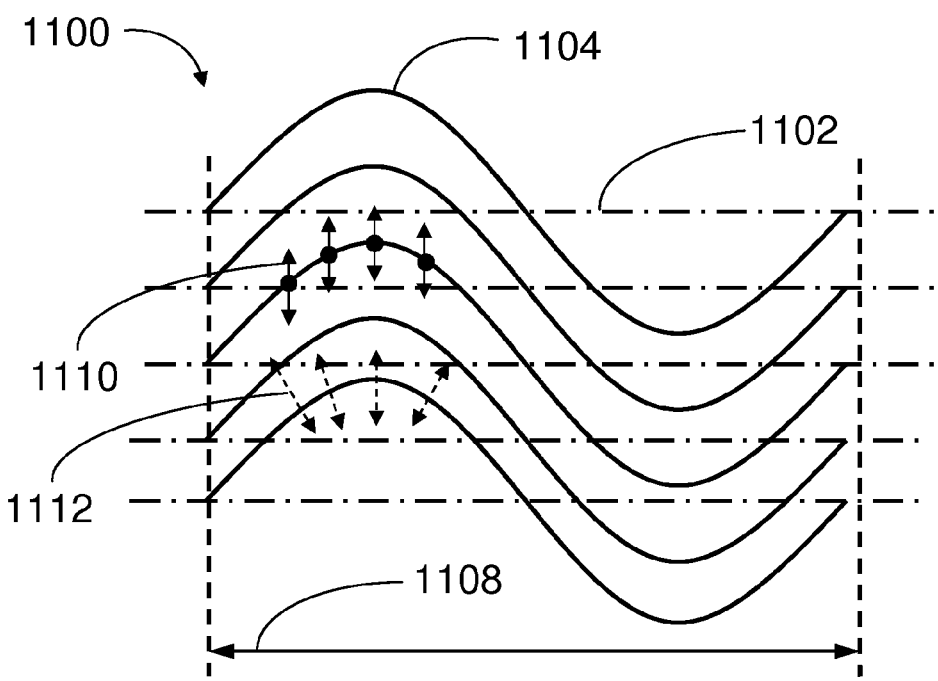
FIG. 11 is a schematic diagram of non-circular virtual data tracks according to the invention.
Figure 12:
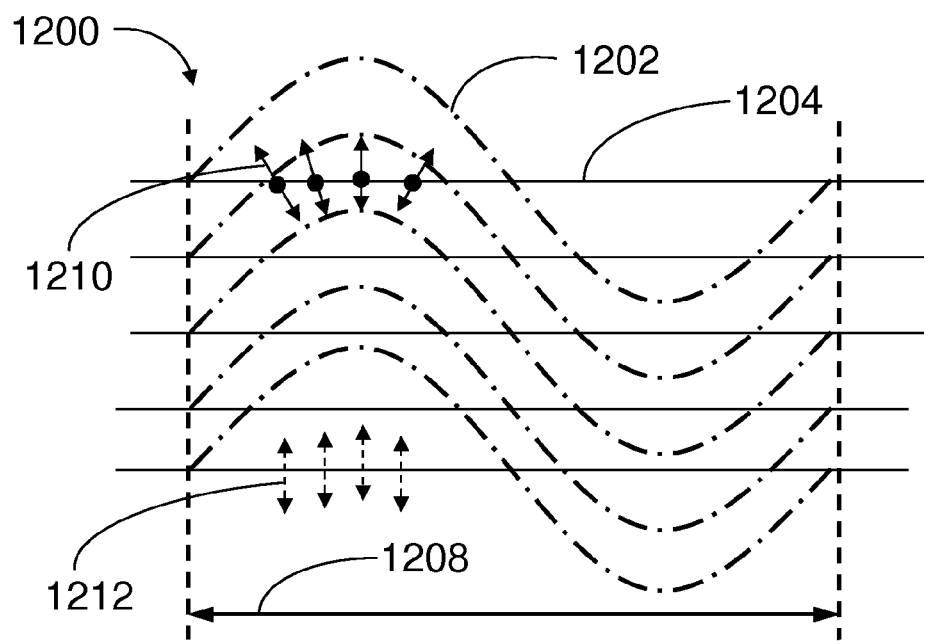
FIG. 12 is a schematic diagram of circular virtual data tracks according to the invention.

FIGS. 11 and 12 show the use of virtual tracks in two different situations: FIG. 11 illustrates a situation in which the data tracks are non-circular while the written servo tracks are circular, while FIG. 12 illustrates the converse situation where the written servo tracks are non-circular while the data tracks are circular. Actual situations may be somewhere between the limiting cases illustrated in FIGS. 11 and 12, i.e., both the servo and data tracks may be non-circular (but still overlapping). In all cases, we can only measure the servo PES, which is derived when a read head passes over a servo burst region within a servo spoke on the disk. This measured PES is always orthogonal to the servo tracks (whether they are circular or non-circular) since it is derived by the read head position relative to the servo burst pattern, which has features which are themselves perpendicular to the servo track. Unfortunately, the information which is needed for writing is the positional error orthogonal to the data tracks, not the servo tracks. Examination of FIGS. 11 and 12 confirms that the servo and data tracks are not parallel to each other (and may typically even cross over), thus the PES signal is essentially in the wrong direction (i.e., not orthogonal to the data tracks). The discussions below for FIGS. 11 and 12 discuss the two scenarios of comparison between servo and data tracks.

When the servo data is pre-written (as may be the case for pre-patterned media), the servo tracks will generally be elliptical, since it is impossible to define the center of rotation exactly enough to correspond to the center of patterning—this corresponds to a large 1× harmonic offset of the servo tracks relative to the center of rotation. When the servo information is written by the write head in situ during manufacturing, the servo information will generally be approximately circular.

There are two general ways known for writing servo tracks:

External (Pre-written)—in this case, the servo tracks (which are defined by a multiplicity of servo burst patterns around the circumference of each track and located within the servo spokes), are pre-written during patterning of the disk medium before it is mounted within the disk drive being manufactured. Virtual data tracks may be used in this case to push the data tracks closer together than the servo tracks to increase TPI. In this example, the servo tracks are essentially always elliptical or 1× (and possibly also 2×, 3×, etc.) harmonic offset from the center of rotation.

Internal—in this case, the servo tracks are written by the write head after the disk medium has been mounted within the disk drive being manufactured. Again, the data tracks may be pushed closer together than the servo tracks to increase TPI. In this case, the servo tracks may be more precise relative to the center of rotation.

The servo tracks essentially define a "coordinate system" for writing the data tracks, typically with 1.5 to 2 or more data tracks written radially for each servo track. If the servo tracks are not evenly spaced (i.e., are squeezed in some places) radially, there is no way for the system to detect this, and those data tracks written based on this servo track "coordinate system" will also be squeezed as a result—this may result in undesirable excessive read errors. Virtual tracks allow the data track spacings to be more uniformly spaced, thus reducing or eliminating excessive squeeze of the data tracks, thereby reducing read errors. Data track squeeze can be reduced through the use of WI protection according to the invention, however, since servo track squeeze is undetectable, its effects can only be reduced through non-circular and/or intersecting data tracks as shown in FIGS. 11 and 12, below.

Non-Circular Data Tracks with Circular Servo Tracks

FIG. 11 is a schematic diagram 1100 of non-circular virtual data tracks 1104 and circular servo tracks 1102. In general, there will typically be 1.5 to 1.0 or more data tracks 1104 for each servo track 1102 (although the example shown here shows a 1:1 ratio of track types). This situation would most often be the case with internally-written servo burst information. The non-circular data tracks 1104 each may intersect one or more of the circular servo tracks 1102. As is always the case, the measured servo PES direction is orthogonal to local direction of the servo tracks, as discussed above. Each PES value is illustrated by a black circle with attached arrows 1110 indicating the purely radial direction of the positional error signals—the PES measurements in this example are purely radial because the servo tracks 1102 are circular. Arrows 1112 correspond to the direction of positional error that we actually want: orthogonal to the data tracks 1104, not to the servo tracks 1102. A full rotation of the disk medium is indicated by dimension arrow 1108—data tracks 1104 pass through exactly one full sinusoidal cycle across dimension 1108, consistent with a 1× harmonic distortion.

Circular Data Tracks with Non-Circular Servo Tracks

FIG. 12 is a schematic diagram 1200 of circular virtual data tracks 1204 according to the invention, each corresponding to a non-circular servo track 1202. As in FIG. 11, there will typically be 1.5 to 1.0 or more data tracks 1204 for each servo track 1202 (although the example shown here shows a 1:1 ratio of track types). This situation would most often be the case with externally-written servo burst information. The circular data tracks 1204 each may intersect one or more of the non-circular servo tracks 1202. As is always the case, the measured servo PES direction is orthogonal to the servo tracks, as discussed above. Each PES value is illustrated by a black circle with attached arrows 1210 indicating the typically non-radial directions of the positional error signals—the PES measurements in this example are usually non-radial because the local slopes of the servo tracks 1202 are usually non-zero (except the small number of sectors where the servo track is turning around radially). Arrows 1212 correspond to the radial directions of positional error that we actually want: orthogonal to the data tracks 1204. A full rotation of the disk medium is indicated by dimension arrow 1208—servo tracks 1202 pass through exactly one full sinusoidal cycle across dimension 1208, consistent with a 1× harmonic distortion.

Use of Virtual Tracks to Reduce Data Track Squeeze

Figure 13:
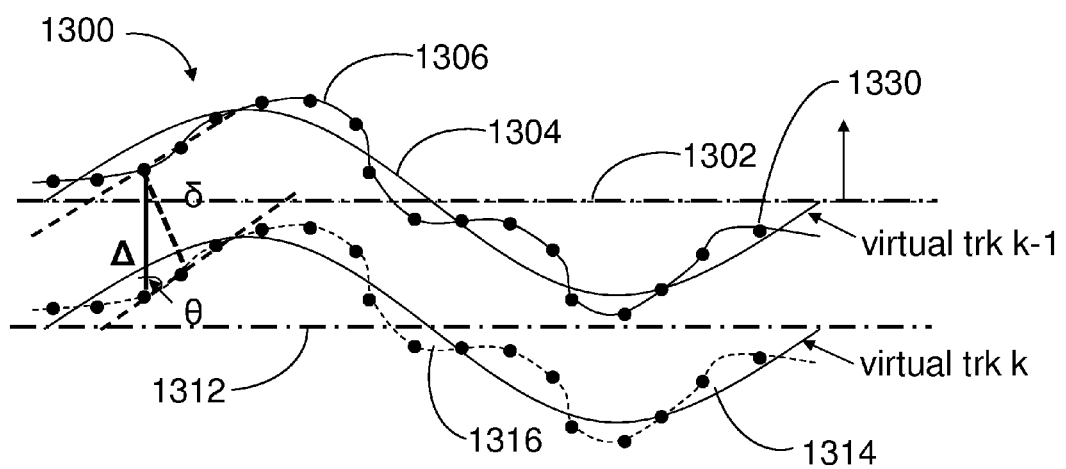
FIG. 13 is a schematic diagram of two neighboring virtual tracks, illustrating polynomial or harmonic fits to the PES measurements.

FIG. 13 is a schematic diagram 1300 of two neighboring virtual tracks 1304 and 1314, illustrating smooth (i.e., low spatial frequency) polynomial or harmonic fits to the PES measurements. The conventional circular tracks 1302 and 1312 show how the virtual tracks 1304 and 1313 oscillate radially inwards and outwards relative to tracks 1302 and 1312, respectively, with an overall average deviation of zero. PES values along the track centers 1306 and 1316 are illustrated by black circles 1330, with the corresponding PES error information always being orthogonal to the local slope of the servo track. The calculation of the required radial track spacing $\Delta$ employs a $\theta$ value which is determined using the smoothed virtual tracks to reduce numerical errors. This diagram applies to FIG. 11, where the servo tracks are circular and the data tracks are non-circular. The polynomial curves 1306 and 1316 provide high spatial frequency (small magnitude) positional information, while the corresponding underlying virtual tracks 1304 and 1314 provide low spatial frequency (large magnitude) positional error data. Tracks 1304 and 1314 would be used to generate local values of $\theta$ (to avoid the rapid variations in data which could occur if polynomial curves 1306 and 1316 were used to generate $\theta$). The polynomial curves 1306 and 1316 are used to generate the local values for $\Delta$, as shown.

Flowchart for Implementing Radial Distance Corrections

Figure 14:
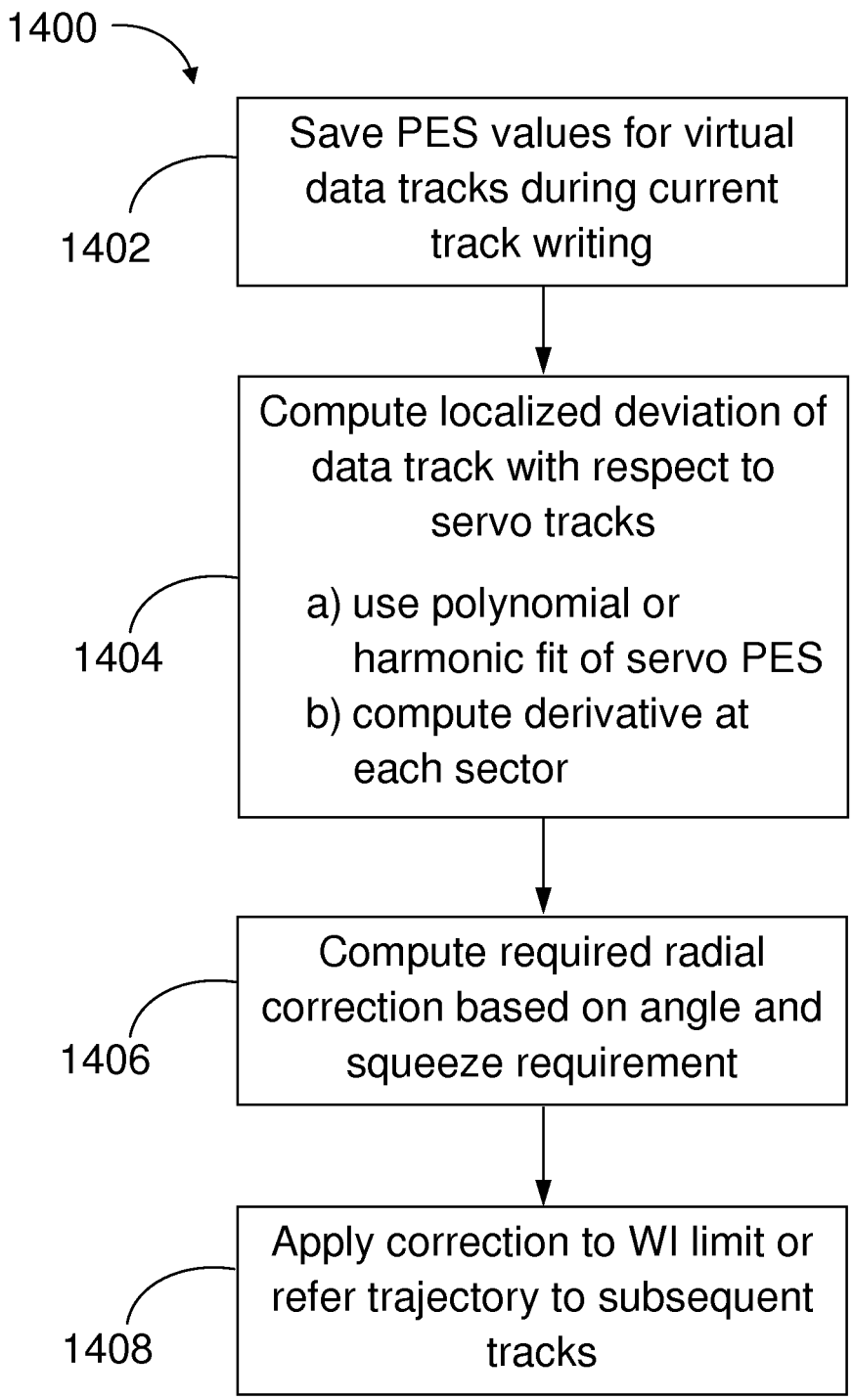
FIG. 14 is a flowchart for implementing the feed forward write inhibit method according to the present invention.

FIG. 14 is a flowchart 1400 for implementing a feed forward write inhibit (FFWI) method according to the present invention. In block 1402, position error signals (PES) are acquired during the writing of the current track as the read head passes across servo burst regions. As discussed above, there are typically around 250 servo spokes or zones, each containing a servo burst region used to generate the a PES value for each rotation of the disk medium (giving a total number of PES values equal to the number of servo spokes). Each PES value may typically comprise 2 bytes of radial position information. As discussed below in FIG. 15, this data may be stored in a cache memory and/or on the disk itself. An advantage of storage on the disk is that the data will then be non-volatile and thus still available for use during recovery from an emergency power off (EPO) event. Next, in block 1404, the localized deviation of the data track with respect to the servo tracks is computed. A harmonic (i.e., 1×, 2×, etc.) sinusoidal waveform relative to the disk rotation (e.g. curve 1304) or a polynomial fit of the PES servo data (e.g., curve 1306) enables the determination of the local slope of the servo track for each sector around the track. Block 1406 then computes the required radial head position correction based on angle and squeeze requirements, as discussed in FIG. 13. This correction is now more accurate since it is based on the multiple servo sector PES (computed in block 1404), instead of just the PES at a single sector. Finally, in block 1408, the required radial correction from block 1408 is applied to either the write inhibit (WI) limit or is used as the reference trajectory during writing of subsequent tracks.

Use of the Feed-Forward Write Inhibit Method with Virtual Tracks

The virtual track concept may be utilized in conjunction with the feed-forward write inhibit method. In this case, the benefits of improved storage densities will enable the data tracks (either circular or non-circular) to be written more closely together using the "coordinate system" defined by the overlapping servo tracks (either non-circular or circular). In addition, improved writing performance, is also possible using virtual tracks.

Alternatively, the virtual track concept may be utilized in the absence of the FFWI method. In this case, the upper write-inhibit limit would be set to:

$$PES(k) \geq L, \text{ and}$$

$$PES(k) \leq -L,$$

as discussed in the Background section, instead of to:

$$PES(k) \geq L, \text{ and}$$

$$PES(k) \leq -\alpha L + PES(k-1),$$

where $\alpha$=the FFWI factor.

Data Storage System Embodying the Present Invention

Figure 15:
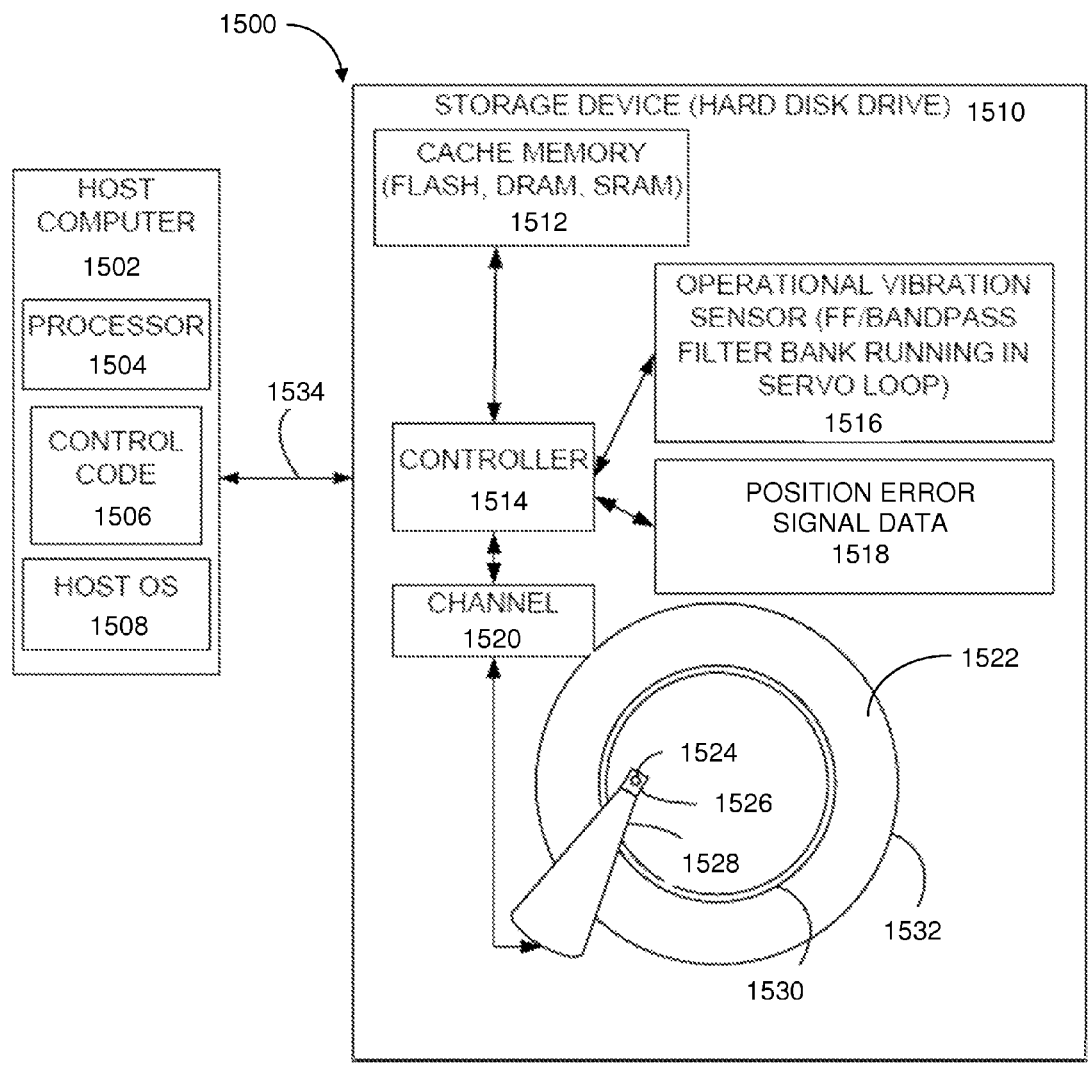
FIG. 15 is a schematic diagram of a data storage system according to the present invention.

FIG. 15 is a schematic diagram of a data storage system 1500 embodying the present invention. System 1500 includes a host computer 1502, a storage device 1510, such as a hard disk drive 1510, and an interface 1534 between the host computer 1502 and the storage device 1510. Host computer 1502 includes a processor 1504, a host operating system 1508, and control code 1506. The storage device or hard disk drive 1534 includes a controller 1514 coupled to a data channel 1520. The storage device or hard disk drive 1510 includes an arm 1528 carrying a read/write head including a read element 1524, and a write element 1526. The hard disk drive (HDD) 1510 advantageously is a Shingled Disk Drive (SDD) to achieve high track density recording magnetic patterns of data on a writable disk surface 1522 of disk 1532 in overlapping circular tracks using shingled magnetic recording (SMR).

In operation, host operating system 1508 in host computer 1502 sends commands to hard disk drive 1510. In response to these commands, hard disk drive 1510 performs requested functions such as reading, writing, and erasing data, on disk surface 1522. Controller circuit 1514 causes write element 1526 to record magnetic patterns of data on a writable surface of disk 1522 in tracks 1530. The controller circuit 1514 positions the read head 1524 and write head 1526 over the recordable or writable surface 1522 of a disk 1532 by locking a servo loop to predetermined servo positioning burst patterns, typically located in a servo spokes or zones. The predetermined servo positioning pattern may include a preamble field, a servo sync-mark (SSM) field, a track/sector identification (ID) field, a plurality of position error signal (PES) fields, and a plurality of repeatable run out (RRO) fields following the burst fields.

In accordance with embodiments of the invention, system 1500 includes a cache memory 1512, for example, implemented with one or a more of: a flash memory, a dynamic random access memory (DRAM) and a static random access memory (SRAM). A sensor 1516, such as an accelerometer, detects operational vibration conditions and provides operational vibration disturbance spectrum information to the controller 1514. An adjusted track pitch information table 1518 stores changed track pitch information when an operational vibration condition occurs.

In accordance with embodiments of the invention, controller circuit 1514 saves the PES information 1518 for a full rotation of disk 1532 for use during read operations. This PES data 1518 can be written to specific location on the disk to retain the information during a power off event.

System 1500 including the host computer 1502 and the storage device or hard disk drive 1510 is shown in simplified form sufficient for understanding the present invention. The illustrated host computer 1502 together with the storage device or hard disk drive 1510 is not intended to imply architectural or functional limitations. The present invention can be used with various hardware implementations and systems and various other internal hardware devices.

Alternative Embodiments within the Scope of the Present Invention

Although the present invention has been described in the context of hard disk drives, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for writing data in a data storage device comprising:
   a rotating data storage medium, comprising:
      data tracks;
      servo data sectors, comprising servo burst patterns;
   a read/write head assembly, comprising a read head configured to read data from the rotating data storage medium, and a write head configured to write data to the rotating data storage medium; and
   a controller for controlling position of the read/write head assembly relative to the rotating data storage medium, wherein the controller is configured to receive positional error signals from the read head generated when the read head passes over a servo burst pattern;
   the method comprising:
      defining a multiplicity of servo tracks on the rotating data storage medium;
      determining a desired pattern of data tracks to be written on the data storage medium, the desired pattern comprising radial spacings of the data tracks;
      defining a coordinate system for the data tracks based on the positional error signals of the multiplicity of servo tracks; and
      writing data to the rotating storage medium into a data track, wherein a location of the data track is determined using the coordinate system, and wherein at least one of a shape of the data track and a shape of the servo track is non-circular.

2. The method of claim 1, wherein both the servo tracks and data tracks are substantially non-circular.

3. The method of claim 1, wherein the servo tracks and data tracks overlap circumferentially around the rotating data storage medium.

4. The method of claim 1, wherein there is a more than one data track for each servo track.

5. The method of claim 1, wherein the data track is defined by a function fitted to the positional error signals.

6. The method of claim 5, wherein the function is a polynomial.

7. The method of claim 5, wherein the function is a harmonic of a single rotation of the rotating data storage medium.

8. The method of claim 7, wherein the harmonic is a first-harmonic of a single rotation of the rotating data storage medium.

9. The method of claim 5, wherein local slope of the virtual data track is used to generate local values for desired spacing between data tracks to be written on the rotating data storage medium by the write head.

10. A method for writing data in a data storage device comprising:
   a rotating data storage medium, comprising:
      data tracks;
      servo data sectors, comprising servo burst patterns;
   a read/write head assembly, comprising a read head configured to read data from the rotating data storage medium, and a write head configured to write data to the rotating data storage medium; and
   a controller for controlling a position of the read/write head assembly relative to the rotating data storage medium, wherein the controller is configured to receive positional error signals from the read head generated when the read head passes over a servo burst pattern;
   the method comprising:
      defining a multiplicity of servo tracks on the rotating data storage medium;
      determining a desired pattern of data tracks to be written on the data storage medium, the desired pattern comprising the radial spacings of the data tracks;
      defining a coordinate system for the data tracks based on the positional error signals of the multiplicity of servo tracks; and
      writing data to the rotating storage medium into a data track, wherein a location of the data track is determined using the coordinate system, and wherein both a shape of the data track and a shape of the servo track are substantially non-circular.

11. The method of claim 10, wherein the servo tracks and data tracks overlap circumferentially around the rotating data storage medium.

12. The method of claim 10, wherein there is a more than one data track for each servo track.

13. The method of claim 10, wherein the data track is defined by a function fitted to the positional error signals.

14. The method of claim 13, wherein the function is a polynomial.

15. The method of claim 13, wherein the function is a harmonic of a single rotation of the rotating data storage medium.

16. A method for writing data in a data storage device comprising:
   a rotating data storage medium, comprising:
      data tracks;

servo data sectors, comprising servo burst patterns;

a read/write head assembly, comprising a read head configured to read data from the rotating data storage medium, and a write head configured to write data to the rotating data storage medium; and a controller for controlling the position of the read/write head assembly relative to the rotating data storage medium, wherein the controller is configured to receive positional error signals from the read head generated when the read head passes over a servo burst pattern;

the method comprising:

defining a multiplicity of servo tracks on the rotating data storage medium;

determining a desired pattern of data tracks to be written on the data storage medium, the desired pattern comprising the radial spacings of the data tracks;

defining a coordinate system for the data tracks based on the positional error signals of the multiplicity of servo tracks; and writing data to the rotating storage medium into a data track, wherein the location of the data track is determined using the coordinate system, wherein both a shape of the data track and a shape of the servo track are substantially non-circular, wherein there is a more than one data track for each servo track, and wherein the data track is defined by a function fitted to the positional error signals.

17. The method of claim 16, wherein the data track is defined by a polynomial function fitted to the positional error signals.

18. The method of claim 16, wherein the function is a harmonic of a single rotation of the rotating data storage medium.

* * * * *